United States Patent [19]
Patterson et al.

[11] Patent Number: 5,762,176
[45] Date of Patent: Jun. 9, 1998

[54] BELT DRIVEN VIBRATORY APPARATUS

[75] Inventors: Harold E. Patterson, Indiana; Paul I. Sleppy, Penn Run, both of Pa.

[73] Assignee: FMC Corporation, Chicago, Ill.

[21] Appl. No.: 747,159

[22] Filed: Nov. 8, 1996

[51] Int. Cl.[6] .................................................. B65B 27/20
[52] U.S. Cl. .................................... 198/770; 198/766
[58] Field of Search ........................... 198/750.1, 752.1, 198/766, 770

[56] References Cited

U.S. PATENT DOCUMENTS

| | | | |
|---|---|---|---|
| 3,053,379 | 9/1962 | Roder et al. | 198/220 |
| 3,882,996 | 5/1975 | Musschoot | 198/220 |
| 4,196,637 | 4/1980 | Barrot et al. | 74/61 |
| 4,313,535 | 2/1982 | Carmichael | 198/766 |
| 4,793,196 | 12/1988 | Davis et al. | 74/61 |
| 4,942,776 | 7/1990 | Quirk et al. | 74/61 |
| 5,131,525 | 7/1992 | Musschoot | 198/770 |
| 5,231,886 | 8/1993 | Quirk et al. | 74/61 |
| 5,584,375 | 12/1996 | Burgess, Jr. et al. | 198/770 X |
| 5,615,763 | 4/1997 | Scrieber | 198/770 X |

FOREIGN PATENT DOCUMENTS 2528269  1/1976  Germany ........................... 198/770

*Primary Examiner*—James R. Bidwell
*Attorney, Agent, or Firm*—Bockey, Milnamow & Katz, Ltd.

[57] ABSTRACT

A vibratory apparatus for use with associated vibratory conveyance equipment includes a pair of counter-rotating shafts respectively carrying counter-rotating eccentrically mounted weights for generating vibratory forces attendant to counter-rotation of the shafts. Economical manufacture of the apparatus is promoted by providing a toothed belt drive for effecting counter-shaft rotation, with externally-mounted bearing assemblies provided to facilitate periodic bearing maintenance. A housing of the apparatus is configured as a fabricated composite beam assembly to promote economical manufacture, and mounting and integration of the vibratory apparatus with associated vibratory feed equipment.

9 Claims, 4 Drawing Sheets

BELT DRIVEN VIBRATORY APPARATUS

TECHNICAL FIELD

The present invention relates generally to vibratory feed equipment such as for handling food products or like material, and more particularly to a vibratory apparatus for effecting the desired vibratory motion of an associated conveyor or the like, wherein the apparatus includes belt-driven, eccentrically-mounted vibratory weights for low-cost fabrication and maintenance.

BACKGROUND OF THE INVENTION

Vibratory feed equipment and conveyors are typically used for handling of materials which may not lend themselves to handling such as by conventional belt conveying equipment. Such vibratory devices can be advantageously employed for handling of bulk food products, such as corn, green beans, bulk frozen food products (such as french fries) and the like. Such vibratory feed equipment can also be advantageously employed for handling of bulk non-food products, such as coal or other minerals. The versatility of such vibratory conveying devices permits them to be readily used in combination with associated size-screening arrangements, flow-controlling discharge gates, and like material-handling components.

Typical vibratory conveying systems have heretofore employed one or more eccentrically-mounted rotatable weights or masses, the rotation of which imparts vibratory forces to associated conveying structures, such as elongated chutes or conveyor beds. In the past, the vibration-generating components of such equipment have included pairs of counter-rotating shafts interconnected by gear drives to effect synchronous counter-rotation, and in turn, counter-rotation of eccentrically-mounted weights carried by the shafts. While such constructions are capable of creating the desired vibratory forces for product conveyance, the gear drives of such previously-known arrangements are relatively expensive, typically requiring cast shaft mountings, and precise machining and assembly of the gear-driven components. It is ordinarily required that the gear drives be disposed in suitable lubrication oil, thus requiring that the gears be suitably housed and sealed. Additionally, gear drives such as described can create undesirably high levels of noise.

In view of the versatility of application of vibratory conveying arrangements, the present invention is directed to a vibration-creating vibratory apparatus which is particularly configured for cost-efficient manufacture and maintenance.

SUMMARY OF THE INVENTION

A vibratory apparatus embodying the principles of the present invention desirably avoids the use of any gear-driven components, and instead effects counter-rotation of a pair of shafts of the apparatus by appropriate belt drives. By virtue of the belt-driven arrangement of the device, the high cost associated with fabrication and maintenance of typical gear-driven vibratory devices is desirably avoided. Additionally, the belt-driven vibratory apparatus of the present invention is desirably quieter than typical gear-driven arrangements. In accordance with the preferred embodiment, bearing assemblies of the apparatus are positioned for efficient periodic maintenance, with the apparatus including a housing in the form of a fabricated composite beam assembly to facilitate economical manufacture, and versatile integration of the apparatus with associated vibratory conveying equipment.

In accordance with the illustrated embodiment, the present vibratory apparatus includes a housing, and first and second counter-rotating shafts rotatably mounted on the housing in parallel relationship to each other. Vibratory forces are created by the provision of first and second vibratory weights respectively eccentrically mounted on the first and second shafts. The vibratory weights are mounted so that counter-rotation of the weights causes the weights to create vibratory forces through the housing, perpendicular to the axes of the shafts.

First and second drive pulleys are respectively mounted on the first and second shafts, with each of the drive pulleys preferably having a toothed configuration. A drive belt interconnects the first and second drive pulleys for synchronous counter-rotation of the first and second drive shafts. In accordance with the present invention, the drive belt comprises a double-sided toothed belt trained about the first and second toothed drive pulleys so that one side of the tooth belt engages one of the toothed drive pulleys, and the other side of the tooth belt engages the other one of the toothed drive pulleys. In this manner, counter-rotation of the first and second drive shafts is effected.

Counter-rotation of the first and second drive shafts is effected by an electric drive motor of the present apparatus, which motor is operatively connected with at least one of the drive shafts for effecting shaft rotation, and attendant vibratory motion of the eccentrically mounted vibratory weights. In one illustrated embodiment, the drive motor is operatively connected with the first one of the dive shafts for effecting driven rotation thereof, with the double-sided toothed drive belt interconnecting the first and second drive shafts so that driven rotation of the first drive shaft effects driven rotation of the second drive shaft via the drive belt. In an alternate embodiment, the drive belt interconnecting the first and second drive shaft also is operatively connected with the drive motor, with a single belt thus effecting driven rotation of the shafts, as well as interconnection of the shafts for synchronous counter-rotation.

In view of the eccentrically-mounted nature of the vibratory weights of the apparatus, the drive shafts of the apparatus, and their associated bearing arrangements, are subjected to relatively high degrees of vibration and wear. Accordingly, the apparatus includes first and second pairs of bearings for respectively rotatably mounting the first and second drive shafts on the housing of the apparatus. Notably, each pair of the bearings is mounted on, and accessible from, the exterior surface of the housing to facilitate maintenance, and periodic replacement as required, of the bearings. A particularly preferred bearing assembly, as hereinafter will be described, facilitates such periodic maintenance.

Other features and advantages of the present invention will become readily apparent from the following detailed description, the accompanying drawings, and the appended claims.

DETAILED DESCRIPTION

Figure 1:
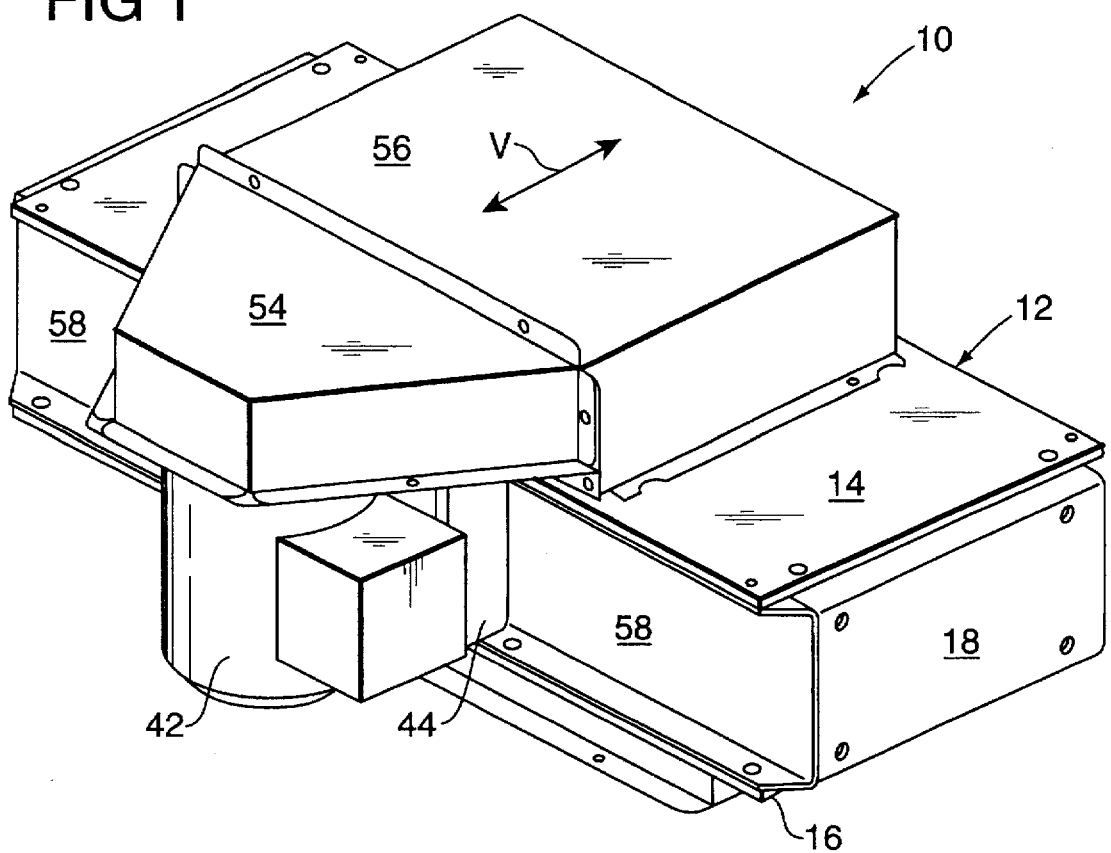
FIG. 1 is a perspective view of a vibratory apparatus embodying the principles of the present invention.
Figure 2:
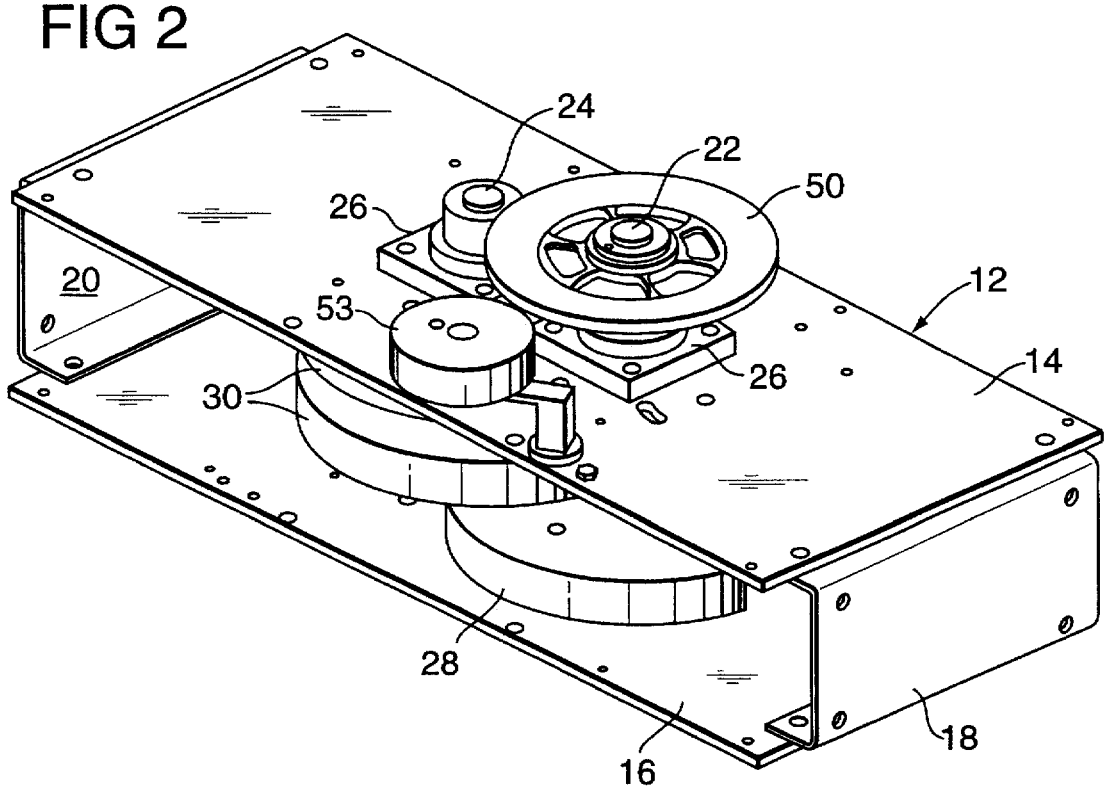
FIG. 2 is a perspective view of the vibratory apparatus shown in FIG. 1, with cover components thereof removed for illustration of interior components of the apparatus.

While the present invention is susceptible of embodiment in various forms, there is shown in the drawings and will hereinafter be described a presently preferred embodiment, with the understanding that the present disclosure is to be considered as an exemplification of the invention and is not intended to limit the invention to the specific embodiment illustrated.

With reference now to the drawings, therein is illustrated a vibratory apparatus 10 (sometimes referred to as a two-shaft exciter) embodying the principles of the present invention. As will be recognized by those familiar with the art, vibratory apparatus 10 finds widespread applicability in vibratory conveying and feed equipment, and is normally rigidly and securely connected to an associated, typically elongated feed chute or conveyor. The vibratory apparatus 10 may alternately be employed with other types of vibratory equipment. Handling of bulk material, such as food products as well as non-food products is desirably accomplished through the use of such vibratory conveying devices, without resort to relatively complex conveying belts or the like.

Vibratory apparatus 10 has been particularly configured for cost-efficient fabrication and operation. To this end, the apparatus 10 includes a housing 12 comprising generally parallel, spaced apart mounting plates 14, 16, with a pair of end plates 18, 20 extending between respective opposite ends of the mounting plates 14, 16. By this arrangement, it will be recognized that the housing 12 is provided in the form of a fabricated composite beam assembly, thus facilitating mounting of the vibratory apparatus with associated components without the need for additional mounting components. Appropriate modification in the length of the housing assembly permits the apparatus 10 to be readily adapted for use with variously configured associated conveyance equipment.

Vibratory apparatus 10 is configured to create the desired vibratory forces for product conveyance by counter-rotation of eccentrically mounted weights or masses. To this end, the apparatus includes first and second drive shafts 22, 24 (see FIG. 4) respectively rotatably mounted on the mounting plates 14, 16 of housing 12 in parallel relationship with each other.

Because the drive shafts 22, 24, and their respective bearing arrangements are subjected to relatively high vibratory forces, the present apparatus has been particularly configured to facilitate the anticipated periodic maintenance of the shaft bearing assemblies. To this end, first and second pairs of bearing assemblies 26 are provided for respectively rotatably mounting the first and second drive shafts on the housing 12. In accordance with a particularly preferred embodiment, each of the bearing assemblies 26 is configured in accordance with U.S. Pat. No. 5,489,156, hereby incorporated by reference, which patent discloses a bearing assembly utilizing and improved clamping arrangement. In a current embodiment, Dodge Imperial spherical roller bearings have been employed. By utilization of this bearing configuration, bearing maintenance and replacement is desirably simplified. Additionally, the eccentric weights mounted on the drive shafts, as will be described, tend to flex and vibrate the drive shafts, causing heat-build up, fretting, and corrosion. Again, the above-described bearing assemblies desirably act to reduce such effects.

Figure 4:
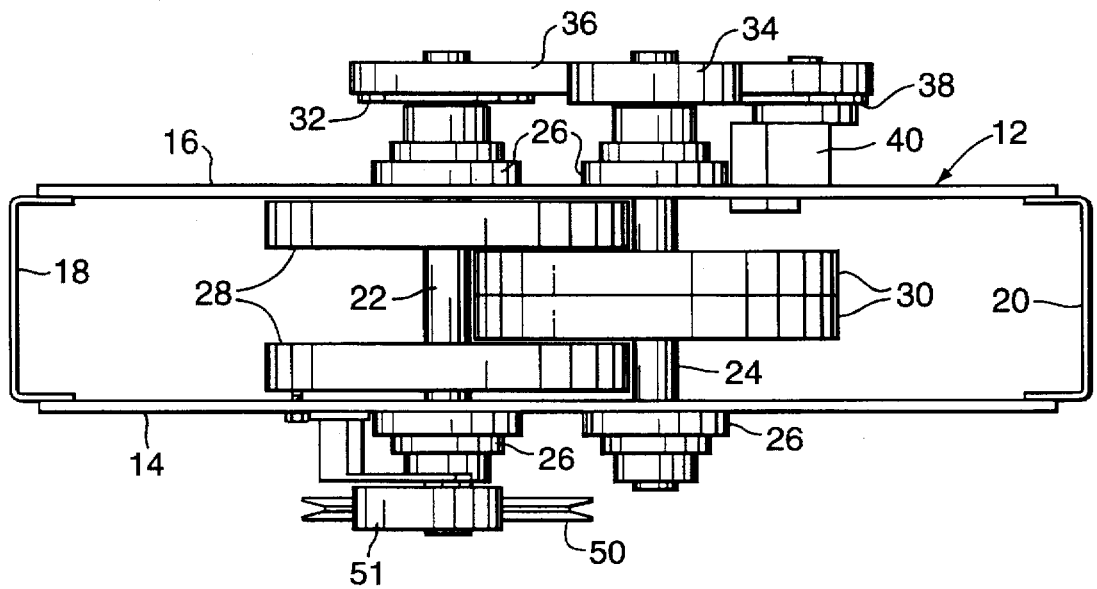
FIG. 4 is a diagrammatic view illustrating, in side elevation, counter-rotating components of the present vibratory apparatus.
Figure 5:
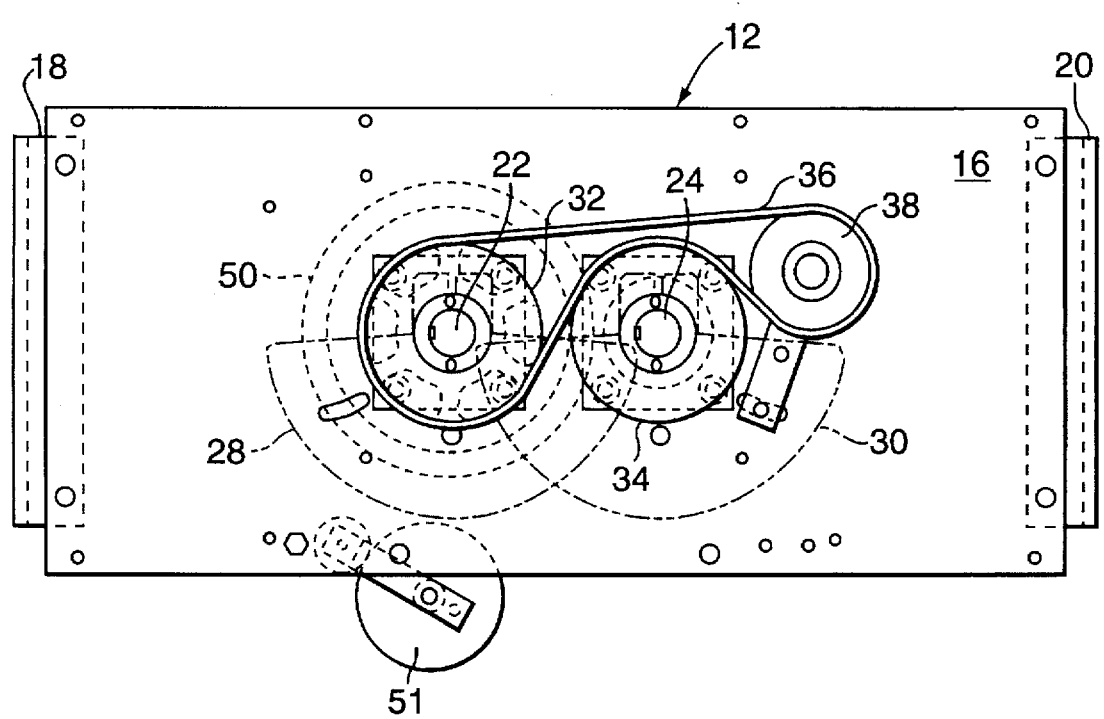
FIG. 5 is a bottom plan view, partially in phantom line, of the present vibratory apparatus.

As illustrated, vibratory weights 28, 30 are respectively mounted on the first and second drive shafts 22, 24 so that counter-rotation of the drive shafts causes the weights to create vibratory forces through the housing perpendicular to the axis of the drive shafts. As illustrated in FIG. 4, it is presently preferred that the vibratory weights be provided in the form of a pair of vibratory weights 28 mounted on first drive shaft 22 in spaced-apart relationship, with a pair of vibratory weights 30 mounted on second drive shaft 24 in adjacent relationship, interposed between weights 28. The weights 28, 30 are illustrated in phantom line in FIG. 5, wherein it will be observed that counter-rotation of the shafts 22, 24 effects counter-rotation of the vibratory weights. By the disposition of the weights illustrated in FIG. 5, vibratory forces are created in a plane perpendicular to the axes of the drive shafts 22, 24, generally along the double-sided arrow "V" shown in FIG. 1. Vibratory forces are generally aligned along the double-sided arrow "V", with counter-rotation of the weights 28, 30 tending to cancel each other out along the line perpendicular to the double-sided arrow "V", generally along the length of housing 12.

Figure 3:
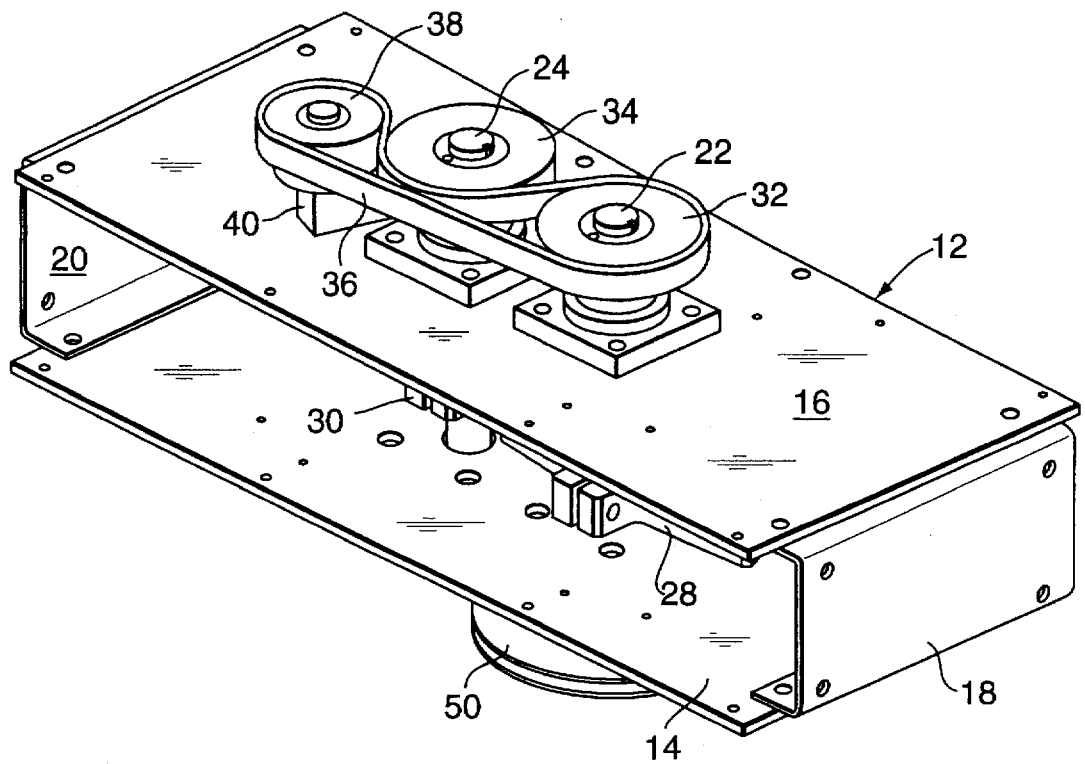
FIG. 3 is a perspective view similar to FIG. 2 illustrating a toothed belt drive arrangement of the present apparatus.

In accordance with the present invention, counter-rotation of the drive shafts 22, 24 is effected via respective toothed drive pulleys 32, 34 mounted on the drive shafts. A double-sided toothed drive belt 36 is trained about the drive pulleys 32, 34, with one side of the drive belt 36 meshing with one of the drive pulleys, and the other side if the drive belt meshing with the other one of the drive pulleys (see FIG. 3). The toothed drive belt is preferably further trained about an adjustable idler 38, adjustably mounted by idler mount 40 mounted on mounting plate 16 of housing 12. By this arrangement, counter-rotation of shafts 22, 24, and in turn vibratory weights 28, 30, is effected. Precise spacing and alignment of the shafts is not required, with the phase angle between the shafts maintained by the gear belt and pulley arrangement.

The present vibratory apparatus includes an electric drive motor for effecting driven counter-rotation of the drive shafts and vibratory weights. In accordance with the embodiment illustrated in FIGS. 1-6, the apparatus 10 includes an electric drive motor 42 mounted on housing 12 by a suitable motor mount 44. Driven rotation of the drive shafts is effected by the provision of a motor pulley 46 on drive motor 42, which operates through a drive belt 48 (illustrated diagrammatically in FIG. 6) which in turn drives a driven pulley 50 operatively connected with first drive shaft 22. Belt tension is maintained by an idler 51. By this arrangement, motor 42 acts to drive the first drive shaft 22, which in turn acts, through toothed pulleys 32, 34 and double-sided toothed belt 36 to effect driven rotation of second drive shaft 24.

Figure 6:
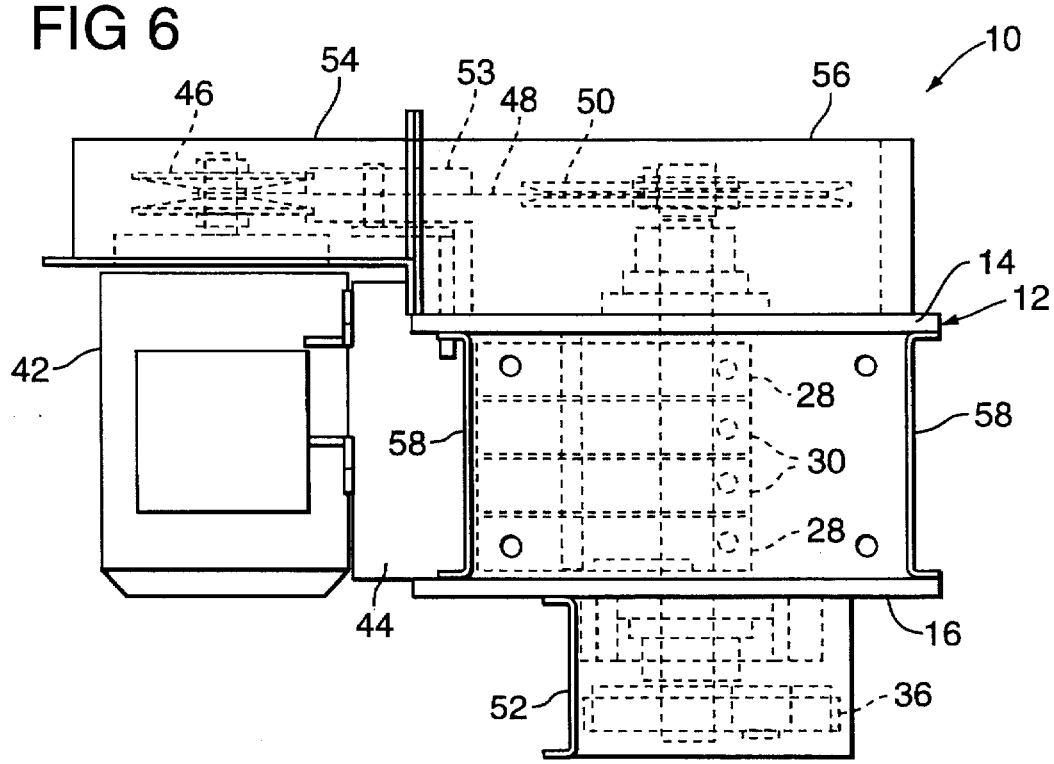
FIG. 6 is an end elevational view, partially in phantom line, of the present vibratory apparatus.

As shown in FIGS. 1 and 6, the vibratory apparatus 10 is preferably provided with suitable removable cover components for enclosing the various belt drives thereof. In particular, a box-like cover 52 preferably covers and encloses drive pulleys 32, 34, and toothed belt 36, with suitable covers 54, 56 enclosing the electric motor drive, i.e., motor pulley 46, drive belt 48, and driven pulley 50. Housing covers 58 enclose the interior of housing 12.

Figure 7:
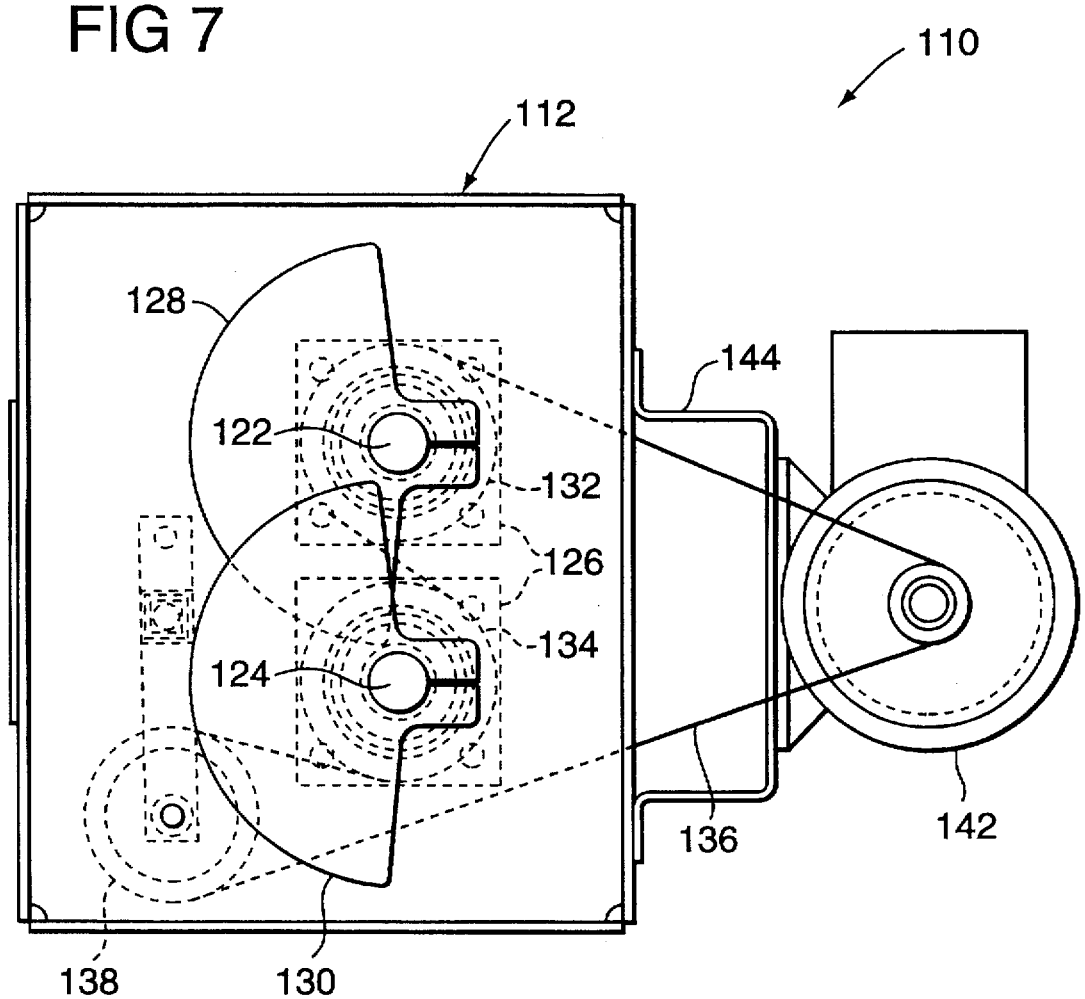
FIG. 7 is a diagrammatic view of an alternate embodiment of the present apparatus comprising a single drive belt.

FIG. 7 illustrates an alternate embodiment of the present invention, wherein components like those of the previously-described embodiment are designated by like reference numerals in the one-hundred series. As will be observed, this alternate embodiment of the present vibratory apparatus, designated 110, is substantially similar in many respects to the previously-described embodiment. However, in this arrangement, a single drive belt 136 is provided for providing the desired driven interconnection of the counter-rotating drive shafts and eccentric weights, with the drive bent 136 in turn also trained about an associated drive motor 142. As in the previously-described embodiment, it is contemplated that the drive belt 135 comprise a double-sided toothed belt, with one side of the toothed belt engaging and meshing with one of the toothed pulleys of one of the counter-rotating drive shafts, with the other side of the belt engaging and meshing with the other of the toothed pulleys of drive shafts.

As will be appreciated, the straightforward construction of the present vibratory apparatus facilitates desirably economical fabrication and maintenance. Configuration of the housing of the apparatus as a fabricated composite beam assembly configures the apparatus in a manner which combines the housing and mounting structures thereof. The absence of any one-to-one gear drives precludes the need for sealing the housing such as for containment of oil therein, thus obviating oil leaks or the like. External mounting of the bearings of the apparatus facilitates the required bearing maintenance without excessive disassembly of the apparatus, thus facilitating its economical use. Oil seals and like components typically required for gear-driven vibratory devices are desirably avoided. By use of the belt drive arrangement, shaft center distance between the counter-rotating drive shafts is flexible, and bearing alignment from side-to-side is not critical. The flexibility in shaft center distance allows the vibratory weight size to be selected as required, dependent upon the amount of unbalance (i.e., vibratory force) required to drive the associated conveying apparatus. Additionally, the provision of a separate belt drive for interconnection of the drive motor with one of the drive shafts permits the drive ratio to be easily changed by appropriate selection of the associated drive pulleys.

The illustrated embodiment includes vibratory weights configured for synchronous operation, with similar eccentricities of the vibratory weights providing a sinusoidal forcing function. The vibratory forces are perpendicular to the axes of shafts 22, 24 and to a plane intersecting the axes of the shafts. However, other configurations can be employed in accordance with the principles disclosed herein. For example, the counter-rotating drive shafts can be intentionally configured to be driven out of phase, or provided with pulley configurations that cause the shafts to rotate at different speeds. Such drive configurations can be used to impart complex motion to a conveying bed for bulk material as it feeds on the conveying surface of a screen or conveyor. One example would be the provision of an exciter (vibratory weights) with the shafts aligned in the direction of material flow, and one shaft rotating twice as fast as the other one. This force combination would impart lateral force and a moment on the driven bed of the machine. Another alternate design would be with the shafts rotating at the same speed, but timed so that the forces from the two shafts add in a direction angular to the primary feed direction of the machine. A possible application for this configuration would be to increase the agitation of a bed of bulk material feeding on a screen to increase the efficiency of the screening action.

From the foregoing, it will be observed that numerous modifications and variations can be effected without departing from the true spirit and scope of the novel concept of the present invention. It is to be understood that no limitation with respect to the specific embodiments illustrated herein is intended or should be inferred. The disclosure is intended to cover by the appended claims all such modifications as fall within the scope of the claims.

What is claimed is:

1. A vibratory apparatus comprising:

a housing;

first and second counter-rotating drive shafts rotatably mounted on said housing in parallel relationship to each other;

first and second vibratory weights respectively eccentrically mounted on said first and second drive shafts said vibratory weights being mounted so that counter-rotation of said drive shafts causes said weights to create vibratory forces through said housing perpendicular to the axes of said drive shafts;

first and second drive pulleys respectively mounted on said shafts;

drive belt means interconnecting said first and second drive pulleys for synchronous counter-rotation of said first and second drive shafts;

drive motor means operatively connected with at least one of said drive shafts for effecting driven counter-rotation of said drive shafts and vibratory motion of said eccentrically mounted vibratory weights; and a motor driven belt operatively connecting said drive motor means with said first drive shaft for effective driven rotation thereof, said drive belt means interconnecting said first and second drive shafts so that driven rotation of said first drive shaft effects driven rotation of said second drive shaft via said drive belt means, said motor driven belt separate from said drive belt means.

2. A vibratory apparatus, comprising:

a housing;

first and second counter-rotating drive shafts rotatably mounted on said housing in parallel relationship to each other;

first and second vibratory weights respectively eccentrically mounted on said first and second drive shafts, said vibratory weights being mounted so that counter-rotation of said drive shafts causes said weights to create vibratory forces through said housing perpendicular to the axes of said drive shafts;

first and second drive pulleys respectively mounted on said shafts;

drive belt means interconnecting said first and second drive pulleys for synchronous counter-rotation of said first and second drive shafts;

drive motor means operatively connected with at least one of said drive shafts for effecting driven counter-rotation of said drive shafts and vibratory motion of said eccentrically mounted vibratory weights; and first and second pairs of bearings for respectively rotatably mounting said first and second drive shafts on said housing, each pair of said bearings being mounted on an exterior surface of said housing to facilitate maintenance of said bearings.

3. A vibratory apparatus in accordance with claim 2, wherein said drive belt means comprises a single drive belt operatively interconnecting said drive motor means with said first and second drive shafts.

4. A vibratory apparatus in accordance with claim 2, wherein said first and second drive pulleys respectively comprise toothed drive pulley mounted on said first and second drive shafts, said drive belt means comprising a double-sided toothed belt trained about said first and second toothed drive pulleys so that one side of said toothed belt meshes with one of said toothed drive pulleys, and the other side of the toothed belt meshes with the other one of said toothed drive pulleys for effecting counter-rotation of said first and second drive shafts.

5. A vibratory apparatus in accordance with claim 4, including an adjustable roller pulley mounted on said housing and engageable with said toothed belt for adjusting the tension of said toothed belt.

6. A vibratory apparatus in accordance with claim 2, wherein said housing comprising a pair of spaced apart mounting plates on which each of said pairs of bearings are respectively mounted, said vibratory weights being positioned within said housing between said mounting plates, said housing further including a pair of end plates each extending between respective opposite ends of said mounting plates to configure said housing as a fabricated composite beam assembly to facilitate mounting of said vibratory apparatus;

first and second vibratory weights respectively eccentrically mounted on said first and second drive shafts, said vibratory weights being mounted so that counter-rotation of said drive shafts causes said weights to create vibratory forces through said housing perpendicular to the axes of said drive shafts;

first and second drive pulleys respectively mounted on said shafts;

drive belt means interconnecting said first and second drive pulleys for synchronous counter-rotation of said first and second drive shafts; and drive motor means operatively connected with at least one of said drive shafts for effecting driven counter-rotation of said drive shafts and vibratory motion of said eccentrically mounted vibratory weights.

7. A vibratory apparatus, comprising a housing comprising a pair of spaced apart mounting plates, and a pair of end plates each extending between respective opposite ends of said mounting plates to configure said housing as a fabricated composite beam assembly;

first and second counter-rotating drive shafts rotatably mounted on said housing in parallel relationship to each other;

first and second pairs of bearings respectively rotatably mounting said first and second drive shafts on said housing, said bearings being mounted on and accessible from an exterior surface of said housing;

first and second vibratory weights respectively eccentrically mounted on said first and second drive shafts within said housing, said vibratory weights being mounted so that counter-rotation of said drive shafts causes said weights to create vibratory forces through said housing perpendicular to the axes of said drive shafts;

first and second toothed drive pulleys respectively mounted on said shafts;

double-sided drive belt means interconnecting said first and second drive pulleys for counter-rotation of said first and second drive shafts; and drive motor means operatively connected with at least one of said drive shafts for effecting driven counter-rotation of said drive shafts and vibratory motion of said eccentrically mounted vibratory weights.

8. A vibratory apparatus in accordance with claim 7, wherein said first and second toothed drive pulleys are sized to effect counter-rotation of said first and second drive shafts at the same speed.

9. A vibratory apparatus in accordance with claim 8, wherein said vibratory weights are positioned on said drive shafts to create said vibratory forces perpendicular to the axes of said shafts and to a plane intersecting the axes of the shafts.

* * * * *